United States Patent
Charfi et al.

(10) Patent No.: US 8,683,434 B2
(45) Date of Patent: Mar. 25, 2014

(54) GENERIC METHOD AND SYSTEM FOR LIFECYCLE MANAGEMENT

(75) Inventors: Anis Charfi, Darmstadt (DE); Heiko Witteborg, Griesheim (DE)

(73) Assignee: SAP AG, Walldorf (DE)

( * ) Notice: Subject to any disclaimer, the term of this patent is extended or adjusted under 35 U.S.C. 154(b) by 56 days.

(21) Appl. No.: 13/439,463

(22) Filed: Apr. 4, 2012

(65) Prior Publication Data
US 2013/0268911 A1    Oct. 10, 2013

(51) Int. Cl.
*G06F 9/44* (2006.01)

(52) U.S. Cl.
USPC ........... 717/120; 717/100; 717/104; 717/105; 717/121

(58) Field of Classification Search
None
See application file for complete search history.

(56) References Cited

U.S. PATENT DOCUMENTS

| | | | |
|---|---|---|---|
| 7,036,110 B2 * | 4/2006 | Jeyaraman | 717/120 |
| 7,213,231 B1 * | 5/2007 | Bandhole et al. | 717/121 |
| 7,913,227 B2 * | 3/2011 | Aikens et al. | 717/120 |
| 8,132,153 B2 * | 3/2012 | Subramanyam | 717/121 |
| 8,239,819 B2 * | 8/2012 | Hafermann et al. | 717/100 |
| 8,312,419 B2 * | 11/2012 | Wilcock et al. | 717/104 |
| 8,555,249 B2 * | 10/2013 | Demant et al. | 717/120 |
| 2003/0033191 A1 * | 2/2003 | Davies et al. | 705/10 |
| 2004/0143811 A1 * | 7/2004 | Kaelicke et al. | 717/101 |
| 2008/0034347 A1 * | 2/2008 | V et al. | 717/101 |
| 2010/0235809 A1 * | 9/2010 | Rath et al. | 717/105 |
| 2010/0306007 A1 * | 12/2010 | GanapathyRaj et al. | 705/8 |
| 2012/0159437 A1 * | 6/2012 | Du et al. | 717/120 |
| 2013/0268911 A1 * | 10/2013 | Charfi et al. | 717/105 |

OTHER PUBLICATIONS

Alemanni et al., Product lifecycle management (PLM) to support product development processes, Mar. 2011, 20 pages.*
N. B. Ruparelia, Software development lifecycle models, May 2010, 6 pages.*
BMC Software, 2011, "BMC Cloud Lifecycle Management," retrieved on Nov. 14, 2012, from http://www.bmc.com/products/product-listing/bmc-cloud-lifecycle-management.html, 3 pages.
BMI, 2009, "Das V-Modell XT," retrieved on Nov. 14, 2012, from http://www.v-modell-xt.de/, 2 pages.
Barry W. Boehm, "A Spiral Model of Software Development and Enhancement" Computer, vol. 21, Issue 5, May 1988, pp. 61-72.
Cloupia Inc., 2011, Cloupia, retrieved Nov. 14, 2012, from http://www.cloupia.com/en/, 2 pages.
Lee Copeland, "Extreme Programming," Dec. 3, 2001, retrieved from Computerworld (online): http://www.computerworld.com/s/article/66192/Extreme_Programming?taxonomyId=063, 3 pages.

(Continued)

*Primary Examiner* — Thuy Dao
(74) *Attorney, Agent, or Firm* — Fish & Richardson P.C.

(57) ABSTRACT

Implementations include methods, systems, and computer-readable storage media for receiving a lifecycle model, the lifecycle model including a representation of a lifecycle of an entity, the lifecycle including a plurality of states and transitions between states, receiving one or more artifacts, the entity including the one or more artifacts, each artifact of the one or more artifacts being associated with at least one state of the plurality of states, receiving a generic lifecycle management toolset, processing the lifecycle model and the one or more artifacts to configure the generic lifecycle management toolset and to define an adapted lifecycle management toolset that is specific to the entity, the adapted lifecycle management toolset including a lifecycle management interface, and providing the lifecycle management interface for display on a display device, the lifecycle management interface displaying representations of states of the plurality of states and a status of each state.

19 Claims, 9 Drawing Sheets

(56) References Cited

OTHER PUBLICATIONS

Eclipse Foundation, 2011, Eclipse Process Framework Project (EPF), retrieved Nov. 14, 2012, from http://www.eclipse.org/epf/, 1 page.
Todd Grimm, "The Human Condition: A Justification for Rapid Prototyping," Time Compression Technologies, vol. 3, No. 3, May 1998, 6 pages.
IBM, 2011, "IBM Cloud Service Provider Platform," retrieved Nov. 14, 2012, from http://www-01.ibm.com/software/tivoli/cloudcomputing/service-provider-platform/, 1 page.
IBM, 2011, "Rational Team Concert," retrieved Nov. 14, 2012, from http://www-01.ibm.com/software/rational/products/rtc/, 3 pages.
IDS Scheer AG, 2011, "ARIS Platform," retrieved Nov. 14, 2012, from http://www.ids-scheer.de/de/ARIS_ARIS_Platform/7796.html, 2 pages.
ISO. (2004). ISO/IEC 15504-1:2004—Information technology—Process assessment—Part 1: Concepts and vocabulary. Retrieved Feb. 18, 2011, from ISO/IEC 15504-1:2004—Information technology—Process assessment—Part 1: Concepts and vocabulary: http://www.iso.org/iso/iso_catalogue/catalogue_tc/catalogue_detail.htm?csnumber=38932. 26 pages.
Microsoft, 2011, "Systems Center Operations Manager," retrieved Nov. 14, 2012, from http://www.microsoft.com/systemcenter/en/us/operations-manager.aspx, 3 pages.
Microsoft, 2011, Visual Studio Application Lifecycle Management, retrieved Nov. 14, 2012, from http://msdn.microsoft.com/library/fda2bad5(VS.100).aspx, 5 pages.
OMG, "Software & Systems Process Engineering Meta-Model," Apr. 2008, retrieved from http://www.omg.org/cgi-bin/doc?formal/Apr. 1, 2008, 236 pages.
Winston W. Royce, "Managing the Development of Large Software Systems," Proceedings of the IEEE WESCON, Aug. 1970, pp. 328-338.
Softpanorama, "Software Life Cycle Models," Aug. 2009, retrieved Nov. 14, 2012, from http://www.softpanorama.org/SE/software_life_cycle_models.shtml, 16 pages.

\* cited by examiner

| Service Artifact | Roles | S1 Req. identified | S2 Interface defined | S3 Components identified | S4 Service designed | S5 Service implemented | S6 Service deployed | S7 Service tested |
|---|---|---|---|---|---|---|---|---|
| Requirements Artifacts 502 | Architect | Create | | | | | | |
| | Designer | | Read | Read | Read | | | |
| | Developer | | | | | | | |
| | Tester | | | | | | | Read |
| Architecture Documents 512 | Architect | Create | Update | Update | Update | | | |
| | Designer | | Read | Read | Read | | | |
| | Developer | | | | | | | |
| | Tester | | | | | | | |
| Technical Specification 516 | Architect | | | | | | | |
| | Designer | | | | Create | | | |
| | Developer | | | | | Read | | |
| | Tester | | | | | | | Read |
| Implementation Artifacts 518 | Architect | | | | | | | |
| | Designer | | | | | | | |
| | Developer | | | | | Create | Update | |
| | Tester | | | | | | | Read |
| Service and Interface Descriptions 504 | Architect | | | | | | | |
| | Designer | | Create | C/U | C/U | | | |
| | Developer | | | | | Read | Update | |
| | Tester | | | | | | | Read |
| Policies & SLAs 514 | Architect | | | | | | | |
| | Designer | | Create | | Read | | | |
| | Developer | | | | | Read | Update | |
| | Tester | | | | | | | Read |
| User Interface Artifacts 520 | Architect | | | | | | | |
| | Designer | | | | | | | |
| | Developer | | | | | Create | | |
| | Tester | | | | | | | Read |
| Testing Documents 522 | Architect | | | | | | | |
| | Designer | | | | | | | |
| | Developer | | | | | | | |
| | Tester | | | | | | | C/U |

GENERIC METHOD AND SYSTEM FOR LIFECYCLE MANAGEMENT

BACKGROUND

Lifecycle management can be provided in various contexts, such as software systems lifecycle management, methods lifecycle management, product lifecycle management, information lifecycle management. The lifecycle management of a system (e.g., a software system) is a complex task that is generally addressed on a case-by-case basis. For each individual system, a tailored and dedicated lifecycle management system is developed and implemented.

Customized lifecycle management has several limitations. For example, the details of an underlying lifecycle model are mostly hidden in the internal implementation of the lifecycle management system. Users of the system are often unable to understand and to view the states and transitions of the lifecycle model, user roles, and/or the artifacts of the entity that are modified in each transition. As another example, each change in the lifecycle model can only be realized by modifying the implementation of the lifecycle management system, which limits the extensibility of such systems. Further, customized lifecycle management systems are not easily reusable. Consequently, extensibility, adaptability and reuse are limited.

SUMMARY

Implementations of the present disclosure include computer-implemented methods for generating a lifecycle model. In some examples, methods include actions of receiving a lifecycle model, the lifecycle model including a representation of a lifecycle of an entity, the lifecycle including a plurality of states and transitions between states, storing the lifecycle model in computer-readable memory, the computer-readable memory, receiving one or more artifacts, the entity including the one or more artifacts, each artifact of the one or more artifacts being associated with at least one state of the plurality of states, storing the one or more artifacts in the computer-readable memory, receiving a generic lifecycle management toolset from the computer-readable memory, processing the lifecycle model and the one or more artifacts to configure the generic lifecycle management toolset and define an adapted lifecycle management toolset that is specific to the entity, the adapted lifecycle management toolset including a lifecycle management interface, storing the adapted lifecycle management toolset in the computer-readable memory, and providing the lifecycle management interface for display on a display device, the lifecycle management interface displaying representations of states of the plurality of states and a status of each state.

In some implementations, processing the lifecycle model and the one or more artifacts to configure the generic lifecycle management toolset includes providing one or more state transition checklists, each state transition checklist identifying one or more activities that are to be completed before the entity can transition from a first state to a second state and storing the one or more state transition checklists in the computer-readable memory.

In some implementations, actions further include: receiving user input, the user input corresponding to a state transition and being generated based on user interaction with the lifecycle management interface, and displaying a state transition checklist of the one or more state transition checklists, the state transition checklist corresponding to the state transition.

In some implementations, actions include: displaying a state transition checklist of the one or more state transition checklists, the state transition checklist corresponding to a state transition, receiving user input, the user input indicating a user selection of an artifact of the one or more artifacts, and, in response to the user input, executing an editor program to enable editing of the artifact.

In some implementations, actions include: determining that a user role associated with a user that provided the user input includes an authorized user role that is authorized to access the artifact in view of a current state, wherein executing the editor program is further in response to determining that the user role associated with the user includes an authorized user role.

In some implementations, actions include receiving one or more user role definitions, each user role definition defining a user role that performs one or more activities associated with a state transition, wherein the generic lifecycle management toolset is further configured based on the one or more user role definitions.

In some implementations, configuration of the generic lifecycle management toolset includes configuring a computer-executable user management system based on the one or more user role definitions, the user management system controlling user access to the one or more artifacts based on the one or more user role definitions.

In some implementations, the user management system selectively authorizes a user to perform one or more activities on an artifact based on a user role associated with the user. In some implementations, the activities can include the creation of the artifact, the edit of the artifact and/or the reading the artifact.

In some implementations, configuration of the generic lifecycle management toolset includes associating each artifact of the one or more artifacts with a respective artifact editor.

In some implementations, each artifact of the one or more artifacts includes a computer-readable document that can be edited using the respective artifact editor.

In some implementations, actions include: receiving user input associated with an artifact and in response to the user input, retrieving the artifact from computer-readable memory, executing an artifact editor associated with the artifact and displaying the artifact within the artifact editor for editing of the artifact by a user that provided the user input. In some implementations, the user input is received through the lifecycle management interface.

In some implementations, actions include: receiving one or more update semantic definitions, each update semantic defining a subset of the one or more artifacts that are updated during a state transition and one or more user roles that perform updating of the subset of the one or more artifacts, wherein the generic lifecycle management toolset is configured further based on the one or more update semantics definitions. In some implementations, the update semantics definitions can be provided in a spreadsheet or in another form.

In some implementations, the lifecycle management interface is interactive to receive user input. In some implementations, each representation of a state is user-selectable to initiate one or more activities associated with a state transition.

In some implementations, the entity includes software associated with a computer-implemented service.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to systems and methods for lifecycle management that provide a generic and reusable multi-phase approach. The multi-phase approach can be applied to any appropriate entity (e.g., software system), for which a lifecycle of the entity is to be managed. In some implementations, the multi-phase approach includes a lifecycle definition phase, a lifecycle configuration phase and a lifecycle management phase. In some implementations, the lifecycle definition phase includes the definition of a lifecycle model of the entity and the definition of one or more artifacts that make up the entity. In some implementations, the lifecycle definition phase also includes role definition and update semantics definition. In some implementations, the lifecycle configuration phase includes the configuration of a lifecycle management toolset using the lifecycle model and definitions provided in the lifecycle definition phase. In some implementations, and in the lifecycle management phase, the lifecycle management toolset is operational and can be used by one or more users to manage the lifecycle of the entity. In accordance with implementations of the present disclosure, lifecycle management can be generic to the lifecycles of systems being managed. In some examples, and as discussed in further detail herein, systems can include systems that can be represented by a set of artifacts (e.g., software systems represented by a set of software artifacts).

Figure 1:
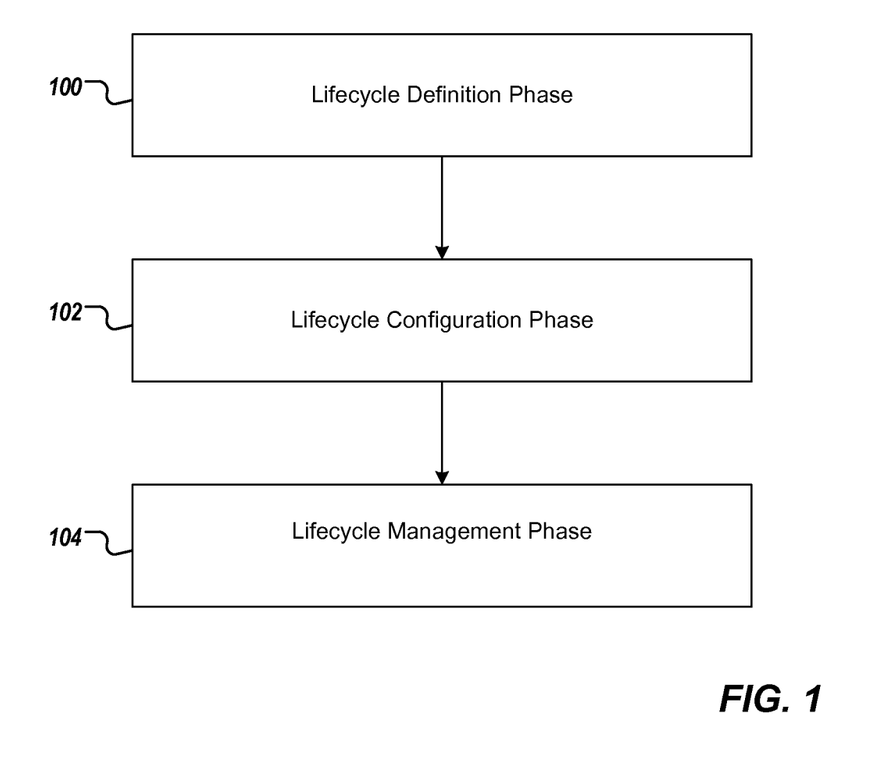
FIG. 1 depicts example phases for lifecycle management in accordance with implementations of the present disclosure.

FIG. 1 depicts example phases for lifecycle management in accordance with implementations of the present disclosure. In the depicted example, phases for lifecycle management include a lifecycle definition phase 100, a lifecycle configuration phase 102 and a lifecycle management phase 104. In some examples, multiple components are provided during the lifecycle definition phase 100. Example components include a lifecycle model, a role definition, an artifact definition and an update semantics definition, each of which is discussed in further detail below. In some examples, components can be provided as one or more computer-readable documents (e.g., stored in computer-readable memory) and can be defined using a variety of computer-readable and/or human-readable languages. Example languages can include informal (e.g., text in a natural language), semiformal (e.g., a table), and formal languages (e.g., concrete specification or modeling languages). The components can be used by a lifecycle management toolset, which supports different user roles in managing the lifecycle of the entity at hand. In the lifecycle configuration phase 102, the components provided in the life cycle definition phase 100 are used to configure the lifecycle management toolset, discussed in further detail below. Once configured, the lifecycle management toolset is operational during the lifecycle management phase 104.

Figure 2:
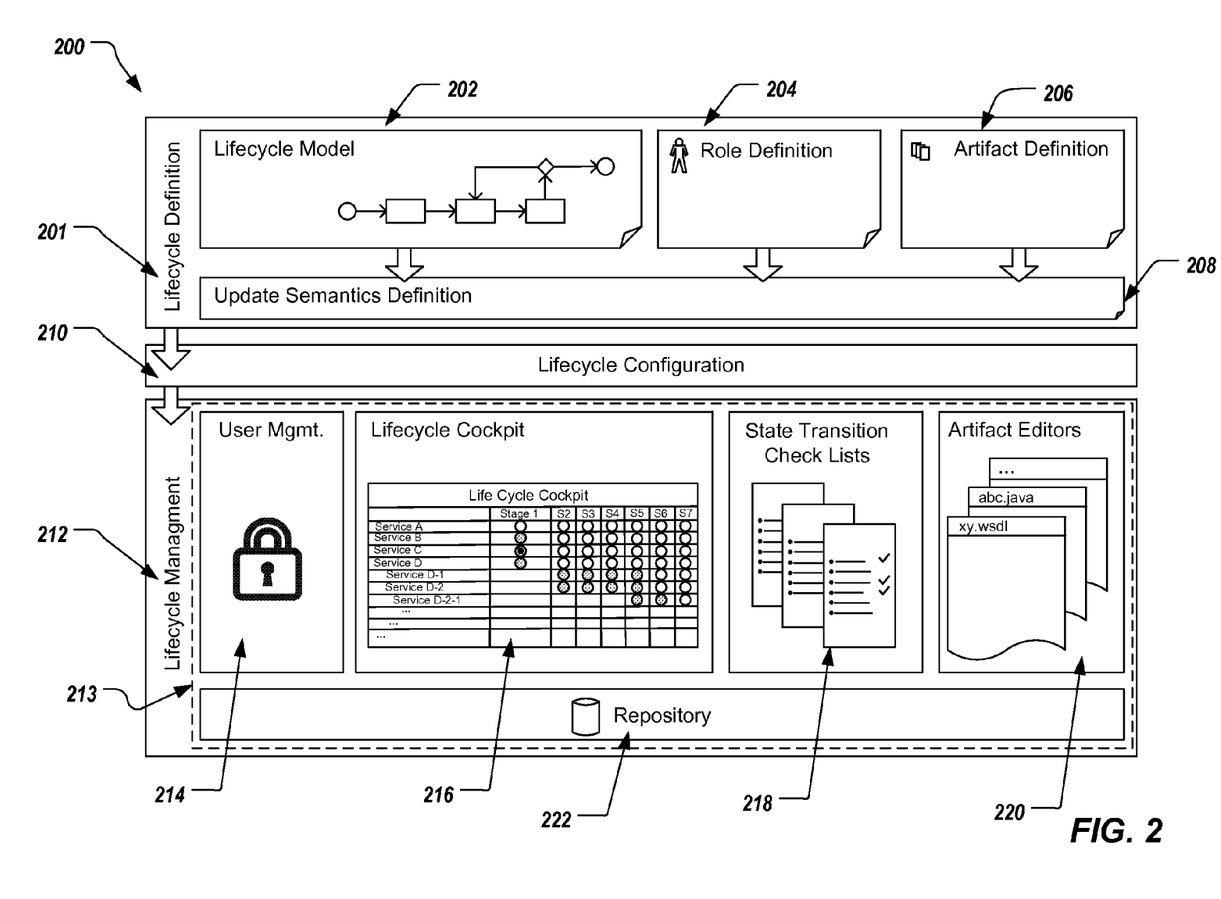
FIG. 2 depicts an example architecture of a lifecycle management system in accordance with implementations of the present disclosure.

FIG. 2 depicts an example architecture of a lifecycle management system 200 in accordance with implementations of the present disclosure. The lifecycle management system 200 embodies the generic multi-phase approach discussed above with reference to FIG. 1. The lifecycle management system 200 includes lifecycle definition 201, lifecycle configuration 210 and lifecycle management 212. As previously discussed, multiple components are provided as part of the lifecycle definition 201. In the depicted example, the components include a lifecycle model 202, role definitions 204, artifact definitions 206 and update semantic definitions 208. In some examples, the update semantic definitions 208 can be provided based on the lifecycle model 202, the role definitions 204 and the artifact definitions 206.

In some implementations, the lifecycle model 202 models the lifecycle of the entity (e.g., software system), whose lifecycle is to be managed. In some examples, the lifecycle model 202 is extensible and is reusable. For example, the lifecycle model 202 can be provided based on a previously generated and stored lifecycle model. In some examples, the lifecycle model 202 can be defined using formal (e.g., UML state diagram, a BPMN process, an EPC process chain), semiformal (e.g. a table, a flow chart diagram) or informal (e.g. a drawing, a text in natural language) modeling languages.

The lifecycle model 202 defines states in the lifecycle of the entity and transitions between states. Consequently, and in some examples, the lifecycle model 202 can be defined using a state machine. By way of non-limiting example, the lifecycle model 202 can define the fundamental structure of a software project, including phases (states), activities and corresponding transition criteria between phases. For example, a software development project can vary according to the customer's requirements, the target application's domain and complexity, size and skills of the development team, and other context specific criteria. Consequently, the lifecycle model for one software development project may be different from the lifecycle model of another software development project. An example lifecycle model is discussed in further detail below with reference to FIG. 4.

In some implementations, the role definitions 204 define different user roles for users that interact with the entity whose lifecycle is managed (e.g., the entity whose lifecycle is modeled by the lifecycle model 202). In one example context, example user roles can include a service provider role, a service host role, a service gateway provider role, a service broker role, a service channel maker role and/or other roles. In another example context, discussed in further detail below, example user roles can include architect, designer, developer and tester. In some examples, a role definition can refer to user roles that operate or interact with a particular entity and/or artifacts at each state of the lifecycle to transition to another state.

In some implementations, the artifact definitions 206 include one or more artifacts that make up the entity. In some examples, artifacts can be associated with one or more categories. Example categories can include implementation artifacts, programming artifacts, user interface artifacts and/or other categories. In some examples, an artifact definition of an entity can be a specification of the artifact that makes up a portion of the entity. Example categories are discussed in further detail below with reference to FIG. 5. As discussed in further detail herein, users can work on artifacts to transition the lifecycle from one state to another state.

In some implementations, the lifecycle model 202 can have associated semantics. Example semantics can include operational semantics that describe how individual artifacts are used by an entity, and/or natural semantics that describe how the overall results of the executions of artifacts are obtained. In some examples, during a transition from one state to another state, the associated semantics can be updated. In some implementations, the update semantics definitions 208 describe activities that can be performed by a specific user role during particular states of the lifecycle. For example, the update semantics definitions 208 can identify one or more artifacts (provided in the artifacts definitions 206) that are updated by one or more user roles (provided in the role definitions 204) during one or more states to enable a state transition (provided in the lifecycle model 202). The update semantic may also specify what part of an artifact can be read or modified by a given user role. By way of non-limiting example, and as discussed in further detail below with reference to FIG. 6, update semantics definitions can be provided as a table.

In some implementations, the components provided from the lifecycle definition 201 can be used in the lifecycle configuration 210 to configure a lifecycle management toolset 213. The lifecycle management toolset 213 is discussed in further detail below. In some examples, a generic lifecycle management toolset can be retrieved from computer-readable memory and can be configured based on the components provided form the lifecycle definition 201. In this manner, the generic lifecycle management toolset can be configured to be specific to the entity whose lifecycle is to be managed using the lifecycle management toolset.

In some implementations, components defined during the lifecycle definition 201 can be associated with one or more editors and/or viewers during the lifecycle configuration 210. By way of non-limiting example, an artifact can include a document provided in a web service description language (WSDL) and a WSDL editor (provided as a computer-executable application) can be associated with the artifact for editing of the artifact. As another example, an artifact can include a user interface provided in a computer programming language (e.g., JAVA), and a JAVA editor (provided as a computer-executable application) can be associated with the artifact for editing of the artifact. As still other examples, a uniform modeling language (UML) diagram editor can be associated with an architecture artifact, a text editor can be associated with a requirements artifact, and a unified service description language (USDL) editor can be associated with a service description artifact.

In some implementations, the lifecycle configuration 210 can also include the creation of user guidance mechanisms, discussed in further detail below, and their association with concrete transitions of the lifecycle model 202. In some examples, user guidance mechanisms can include computer-readable documents that are stored in computer-readable memory. Example user guidance mechanisms can include checklists, wizards, cheat sheets and/or help pages. Depending on the configuration, each user guidance mechanism can be associated with certain states and transitions in the lifecycle model 202. By way of non-limiting example, a checklist can be associated with a particular state transition to ensure that certain operations are performed before the transition from one state to another state can occur.

In some implementations, the lifecycle configuration 210 can include the creation of user accounts and assigning the user accounts to different roles provided in the role definitions 204. In this manner, user access to one or more of the artifacts can be controlled on a role-basis and/or a state basis. For example, a particular user having a user role can access an artifact during one state of the lifecycle, but might not be granted access to the artifact during another state of the lifecycle.

In some implementations, a repository 222, discussed in further detail below, is used to store the artifacts belonging to each entity whose lifecycle is being managed. In some examples, a repository (e.g., a data store provided in computer-readable memory) can be configured to store the components. In some examples, this configuration may include the definition of a directory structure, the setup of a workspace and/or the specification of a connection to a database.

In some implementations, after completing configuration of the lifecycle management toolset 213, the lifecycle management 212 occurs. In some examples, lifecycle management 212 can include user interaction with the lifecycle management toolset 213 for managing the lifecycle of the entity. In the example of FIG. 2, the lifecycle management toolset 213 includes a user management component 214, a lifecycle cockpit 216, state transition checklists 218, artifact editors 220 and a repository 222.

In some implementations, the user management component 214 controls user access to one or more components (e.g., the lifecycle model and/or the artifacts). In some examples, the user management component 214 can use the user role definition 204, the artifact definition 206 and/or the update semantics definition 208 for access control and authorization. By way of non-limiting example, the user management component 214 can verify whether a certain user is authorized to do a certain modification of a chosen artifact at a given state transition in the lifecycle. In some examples, the user management component 214 can be provided as a computer-executable program.

In some implementations, the lifecycle cockpit 216 can be provided as an interactive graphical display that displays a list of one or more managed entities. In some examples, the lifecycle cockpit 216 enables a user to select an entity (e.g., by clicking on a graphical representation of the entity), causing the lifecycle of the entity to be displayed in further detail (e.g., the current state of the entity within the entity's lifecycle). In some examples, the lifecycle cockpit 216 enables the user to initiate a transition to the next state in the lifecycle. In some examples, at each state, the lifecycle cockpit 216 can enables access and changes to relevant artifacts by initiating the viewers and/or editors 220 in response to user input, and retrieving the artifacts from the repository 222 for viewing and/or editing. In some examples, the lifecycle cockpit 216 can display wizards or other user guidance mechanisms to support activities of the user in a particular state of the lifecycle. In some implementations, the lifecycle management toolset 213 can display one or more of the state transition checklists 218. In this manner, a user seeking to transition the entity from one state to another state can be made aware of activities that have been completed and/or that need to be completed to transition the lifecycle states. An example lifecycle cockpit and an example state transition checklist are discussed in further detail below with reference to FIGS. 7 and 8, respectively.

Figure 3:
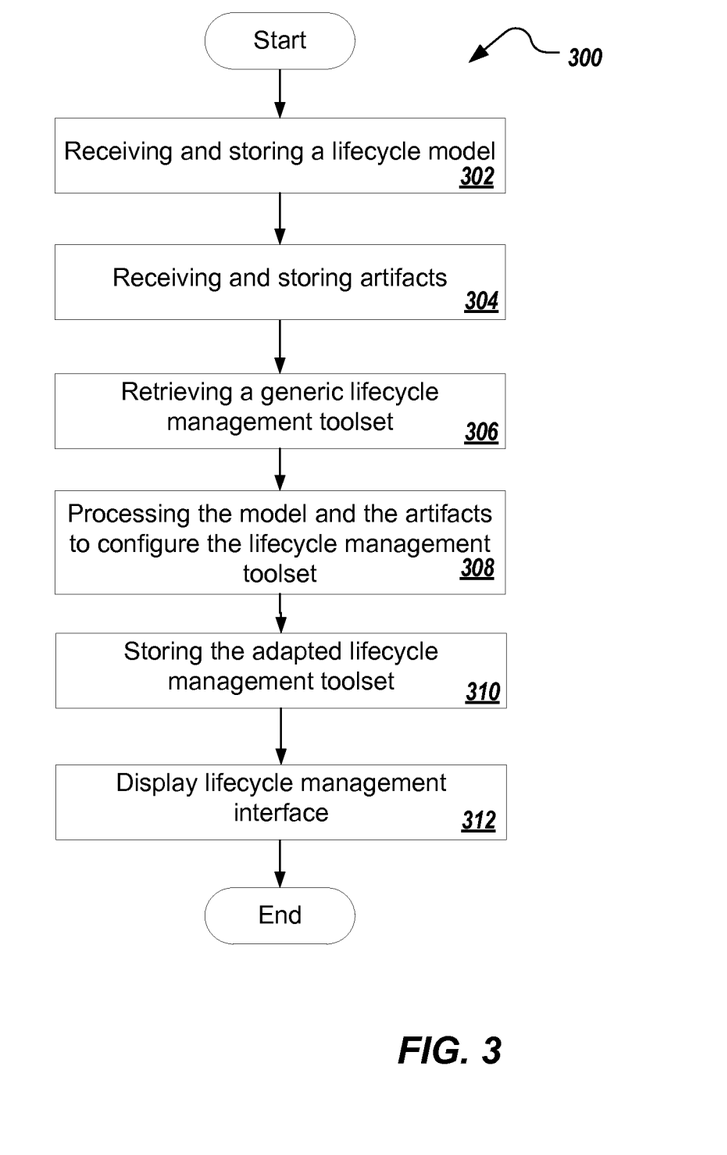
FIG. 3 is a flowchart depicting an example process that can be executed in accordance with implementations of the present disclosure.

FIG. 3 is a flowchart depicting an example process 300 that can be executed in accordance with implementations of the present disclosure. In some implementations, the example process 300 can be executed as one or more computer-programs using one or more computing devices (e.g., server systems).

In some implementations, a lifecycle model of an entity is received and stored (302). In some examples, the lifecycle model can be a generic lifecycle model that can be adapted based on one or more components associated with the entity. In some examples, the lifecycle model can be provided as an entity-specific lifecycle model. One or more artifacts associated with the lifecycle model are received and stored (304). A generic lifecycle management toolset is retrieved (e.g., from computer-readable memory) (306). The lifecycle model and the artifacts are processed to configure the generic lifecycle management toolset (308) and define an adapted lifecycle management toolset that is specific to a lifecycle of the entity. The adapted lifecycle management toolset stored in the computer-readable memory (310). A lifecycle management interface (of the adapted lifecycle management toolset) is provided for display (312).

Implementations of the present disclosure can be illustrated with reference to a non-limiting example context. The example context can include an instantiation of the proposed method and system in the context of managing the service engineering lifecycle of software based services. Some examples can illustrate the management of the lifecycle of services throughout activities from initial requirements analysis, to design, implementation, testing, and deployment. FIGS. 4-8 illustrate examples of the proposed generic method FIG. 3 in this non-limiting example context. It is appreciated that implementations of the present disclosure are applicable in other contexts.

Figure 4:
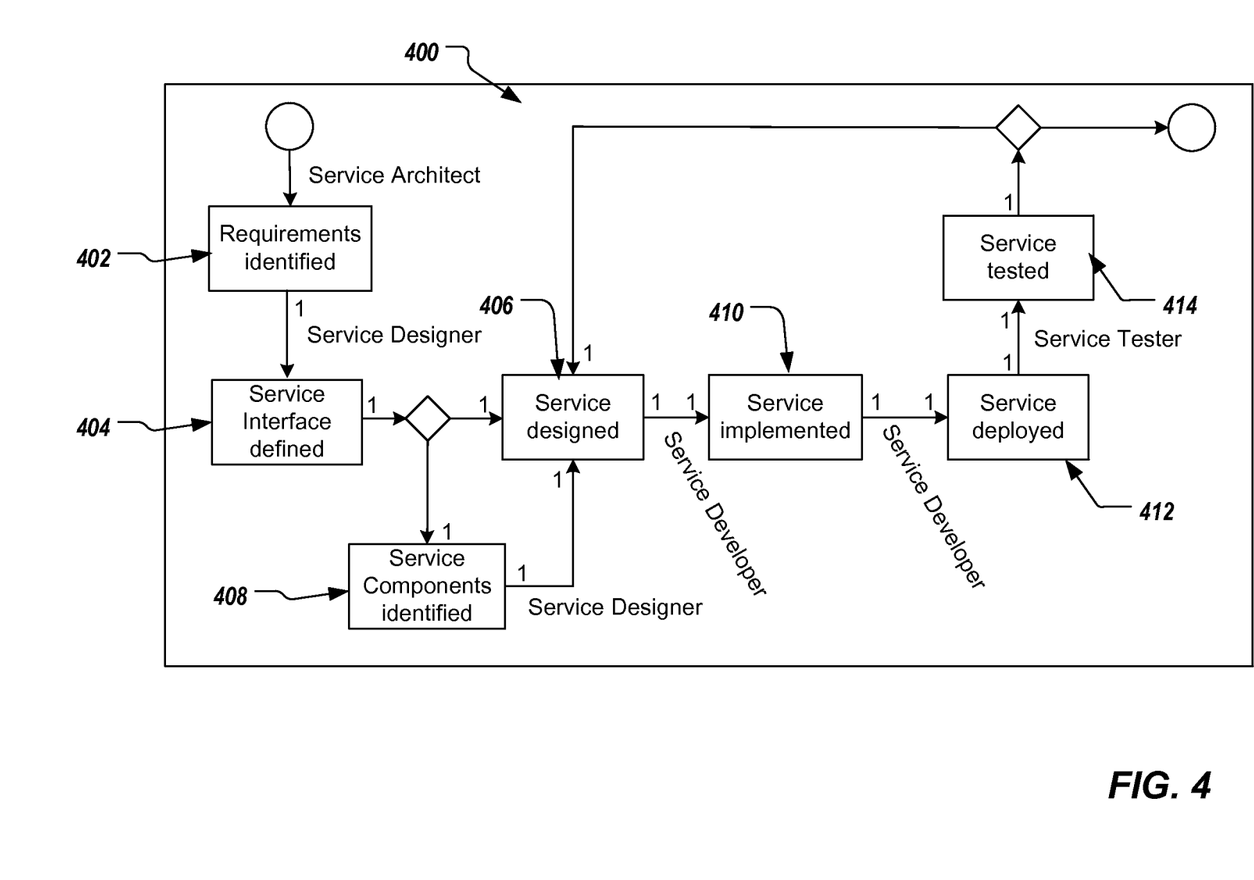
FIG. 4 depicts an example model.

FIG. 4 depicts an example service engineering lifecycle model 400. In some examples, the lifecycle model 400 defines example phases (i.e., stages or states) that the service engineering lifecycle transitions through. In the depicted example, the states include: a requirements identified state 402, a service interface defined state 404, a service designed state 406, a service components identified state 408 (e.g., in the case of a composite service), service implemented state 410, a service deployed state 412, and a service tested 414. In some examples, the lifecycle model 400 can be provided as a computer-readable document that is stored in computer-readable memory. In some examples, the computer-readable document can be provided in a modeling language. In some examples, the states 402, 404, 406, 408, 410, 412, 414 can be denoted as S1, S2, S3, S4, S5, S6, S7, respectively.

Transitions between the states 402, 404, 406, 408, 410, 412, 414 of the lifecycle can be initiated by different user roles. The selection of the user roles can depend on the type of activities that need to be performed before the next state in the lifecycle can be reached. For example, the example lifecycle model 400 includes a service architect role, a service designer role, a service developer role and a service tester role (as annotated in the lifecycle model 400). In some implementations, cardinality notations can indicate whether multiple entities in stage n+1 can be derived from a service in stage n.

In some implementations, the user roles are defined in a user role definition (e.g., role definitions 204 of FIG. 2). The user role definition can identify which user roles perform which activities during which transitions. In some examples, the user role definition can be used for user management, discussed in further detail herein.

According to the illustrated example, the service architect can identify requirements to transition the lifecycle to the requirements identified state 402. Example requirements can include functional and non-functional capabilities and characteristics of the service. From the requirements identified state 402, the lifecycle can transition to the service interface identified state 404. In some examples, the service interface can be defined by the service designer as the behavior of the service. For example, the service designer specifies the interface and the messages through which a consumer (i.e., a user of the service) can interact with the service.

From the service interface identified state 404, the lifecycle can transition to the service designed state 406 or the service components identified state 408. In some examples, the transition to the service designed state 406 can include the realization of the service functionality planned by the service designer and documented in a technical specification. In some examples, the transition to the service components identified state 406 can include the service designer selecting and integrating a composite service or multiple services into a value-added composition service. From the service components identified state 408, the lifecycle can transition to the service designed state 406 (e.g., the service designed plans and documents the service functionality in a technical specification).

From the service designed state 406, the lifecycle can transition to the service implemented state 410. In some examples, the lifecycle transitions to the service implemented state 410 through a service implementation executed by the service developer based on the technical specification. From the service implemented state 410, the lifecycle transitions to the service deployed state 412. The transition to the service deployed state 412 can include the packaging of a service by the service developer and deployment on a runtime system (e.g., an application server). From the service deployed state 412, the lifecycle transitions to the service tested state 414. In some examples, the transition to the service tested state 414 can include the service tester confirming that the realized service conforms to its requirements and interface definition.

In some examples, and with regard to service requirements, the service architect analyses and specifies the initial functional and nonfunctional requirements of the service. The service architect can choose or narrow down the application framework and can define a high-level component design for the service. In some examples, and with regard to the service interface, the service designer can define the contract between the service provider and the service consumer. This can include general descriptions of the service (e.g., the operations made available through the service), as well as the interaction messages and the data formats used in the service. Further, the service designer refines the component design, decides on the integration of other services (e.g., in the case of a composite service), and specifies implementation details in a technical specification.

In some examples, the service developer is responsible for the realization of the service, as described in the technical specification. In some examples, the implemented service is packaged and is internally deployed in an appropriate test environment. In some examples, the service tester examines the deployed service to check whether all functional and non-functional requirements are met and whether the service interface is implemented correctly.

The service that is the subject of the lifecycle model 400 can be composed from multiple artifacts. To generically identify the artifacts that, for example, are to be modified during the service engineering lifecycle, the artifacts can be grouped into categories. In the example context, concrete artifacts for service engineering are scenario-specific, because the artifacts depend on the characteristics of the service. Example services can range from fully automated computer-implemented services (e.g., implemented in software), to information technology (IT) supported services, and to professional (e.g., human) services.

Figure 5:
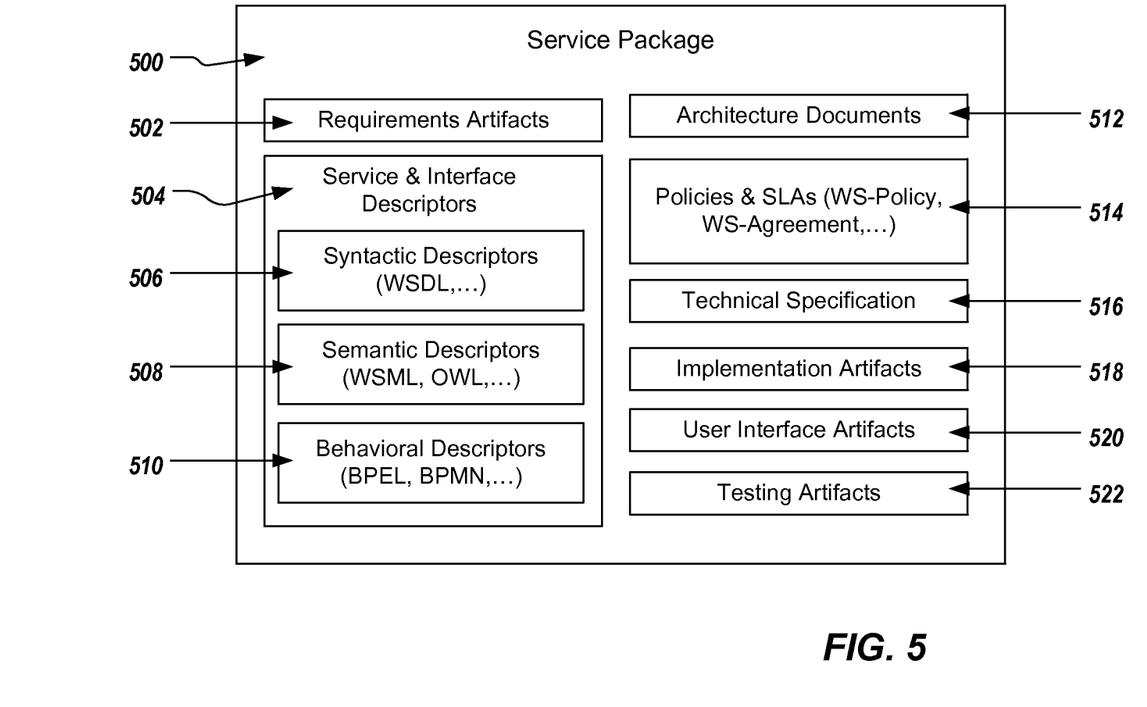
FIG. 5 depicts example artifacts.

FIG. 5 depicts example service engineering artifacts provided in a service package 500. In the depicted example, example artifact categories are provided to enable the artifacts that make up the service to be generically identified and grouped. In some examples, artifacts that can be generically identified can include artifacts that are to be modified at a certain point in the service engineering lifecycle. Other artifacts that can be provided in the service package 500 are the static artifacts (i.e., artifacts that are not changed during the service engineering lifecycle).

In the example of FIG. 5, example categories include: requirements artifacts 502, architecture documents 512, service and interface descriptors 504, policies and service level agreements (SLAs) 514, technical specification 516, implementation artifacts 518, user interface artifacts 520 and testing artifacts 522. In some examples, the requirements artifacts category 502 can include requirements documents that specify the functional and non-functional characteristics of a service. Example requirements documents can include requirements documents, user cases and/or user stories. The architecture documents category 512 can include architecture documents that provide a high-level overview of the service to be developed. Examples of architecture documents can include architectural specification documents and/or UML component diagrams. Referring again to FIG. 4, the requirements artifacts and the architecture documents can be generated by the service architect to transition the lifecycle to the requirements identified state 402.

The service and interface descriptors category 504 can include metadata artifacts related to the description of the service, which can be directed to functional characteristics (e.g., user interfaces) and non-functional characteristics (e.g., pricing information, SLAs). The service and interface descriptors category 504 can include technical descriptions regarding accessing the service and communicating with the service (e.g., transport protocols and message formats). In the depicted example, the service and interface descriptors category 504 includes sub-categories that include a syntactic descriptors sub-category 506, a semantic descriptors sub-category 508 and a behavioral descriptors sub-category 510. For example, interface descriptors can include artifacts directed to syntactic metadata (e.g., documents provided in the web service description language (WSDL)) and can be included in the syntactic descriptors sub-category 506. As another example, interface descriptors can include artifacts directed to the semantics of described concepts (e.g., documents provided in the web service modeling language (WSML) of the web ontology language (OWL)) and can be included in the semantic descriptors sub-category 508. As another example, behavioral descriptors can include artifacts that describe the flow of interaction and/or communication between the service provider and the service consumer, and can be included in the behavioral descriptors sub-category 510.

In some examples, the policies and SLAs category 514 can contain artifacts expressing non-functional concerns about the quality and governance associated with the core functional pieces of the service. An example policy can include a web services policy (WS-policy) and an example agreement can include a web services agreement (WS-agreement). In some examples, the technical specification category 516 can include artifacts that describe the realization of the service's functional requirements in detail. For examples, functional requirements of a service can be detailed in design documents, UML class diagrams and/or UML sequence diagrams.

In some examples, the implementation artifacts category 518 can subsume the internal implementation of the core functionality of the service. Some non-limiting examples of core functionalities can be provided in programming artifacts (e.g., code binaries/libraries), configuration files, deployment descriptors, and data-source descriptors. In some examples, the user interface artifacts category 520 can include artifacts for rendering an interface to the user (i.e., hypertext mark-up language (HTML) code for displaying an interface to a user in a web browser). In some examples, the testing artifacts category 522 can include artifacts related to the process of analyzing and ensuring the quality of the service. In some implementations, the testing artifacts category 522 can include documents describing a high-level test strategy, a detailed test plan, test cases, test scripts, and/or reports that document any errors found during the tests.

Figure 6:
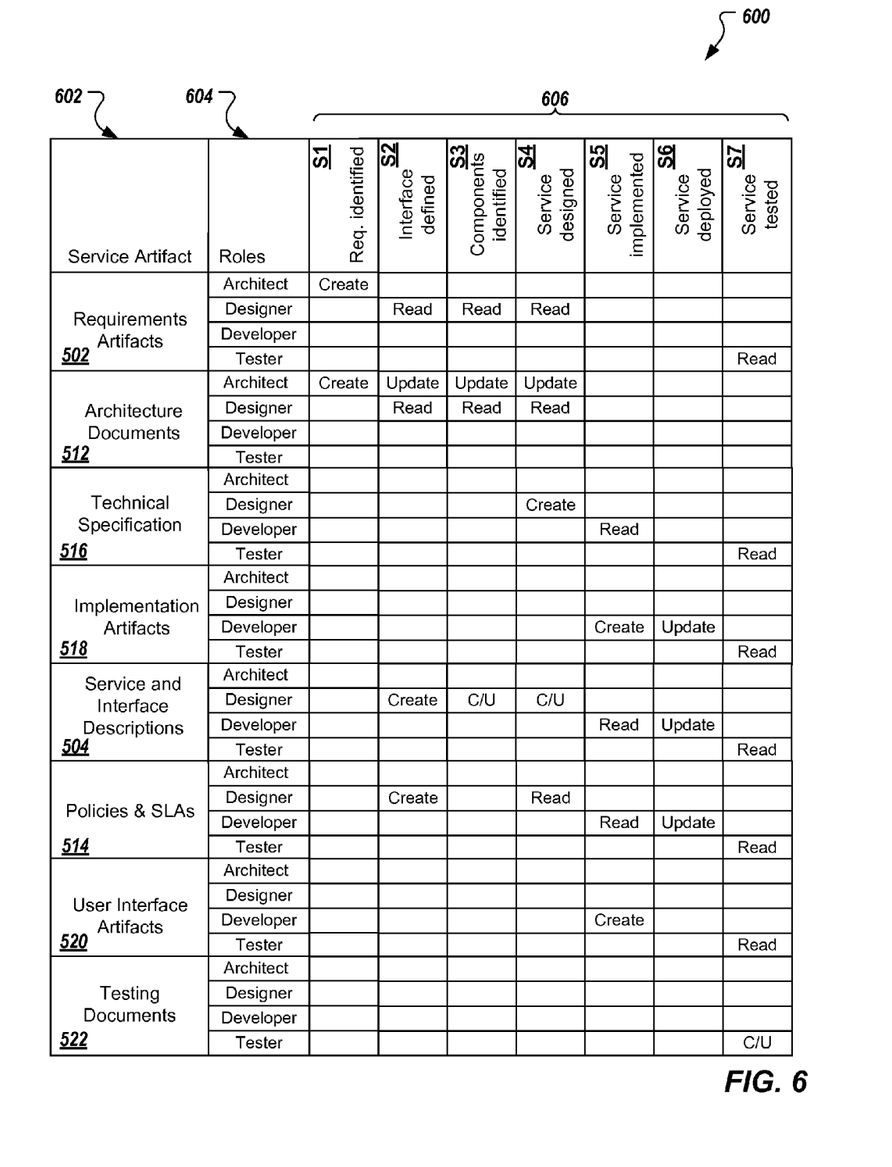
FIG. 6 depicts example update semantics.

FIG. 6 depicts an example of update semantics 600 that could be used with a lifecycle model, such as the example illustrated in FIG. 2. In the depicted example, the update semantics 600 are provided as a table. It is appreciated, however, that the update semantics 600 can be provided in other forms. As discussed above, update semantics can describe activities that can be performed by a specific user role during particular state of the lifecycle. Example activities can include artifact creation (C), artifact updating (U) (e.g., editing) and artifact reading (R) (e.g., non-editing viewing of an artifact). For example, the update semantics can identify one or more artifacts that are updated by one or more user roles during one or more states to enable a state transition.

In the depicted example, the update semantics 600 corresponds to the lifecycle model 400 of FIG. 4 and the service package 500 of FIG. 5. The update semantics 600 includes a service artifacts column 602, a user roles column 604 and lifecycle state columns 606. The service artifacts column 602 includes the artifact categories provided in the service package 500: requirements artifacts 502, architecture documents 512, technical specification 516, implementations artifacts 518, service and interface descriptors 504, policies and SLAs 514, user interface artifacts 520 and testing documents 522. The user roles correspond to the example user roles denoted in the lifecycle model 400 and include service architect, service designer, service developer and service tester. The lifecycle state columns 606 corresponds to the states 402, 404, 406, 408, 410, 412, 414 (i.e., S1, S2, S3, S4, S5, S6, S7, respectively) of the lifecycle model 400.

In the depicted examples, the update semantics 600 specifies which user roles can access particular categories of service artifacts and which activities the user roles can perform on the service artifacts. For example, the service architect can create requirements artifacts and architecture documents to transition the service lifecycle to S1. As another example, the service designer can read the requirements artifacts and the architecture documents and can create the service and interface description artifacts and the policies and SLAs artifacts to transition the service lifecycle to S2.

In some examples, update semantics can be provided as mandatory tasks and optional tasks. For example, depending on the importance of a service artifact, the creation of a given artifact can be either mandatory or optional. Generally, intermediate activities (e.g., read or update) can be optional. In some examples, the actions of the user roles during the service test state can be mandatory. For example, the creation of requirements artifacts can be mandatory for the service architect in order to transition to the requirements identified state S1, while reading of the requirements artifacts can be optional for the service designer to transition to subsequent states (e.g., the interface defined state S2), and reading of the requirements artifacts can be mandatory for the service tester to transition to the service tested state S2.

As discussed above, the lifecycle model, the user roles, the artifact definitions and the update semantics definitions can be used to configure a lifecycle management toolset (e.g., the lifecycle management toolset 213 of FIG. 2). In some examples, a lifecycle management interface can be generated, artifacts defined during lifecycle definition can be associated with one or more editors and/or viewers, user guidance mechanisms can be generated and a repository can be configured. By way of non-limiting example, an artifact can include a document provided in a particular language (e.g., WSDL, JAVA, HTML, UML, USDL, WSDL, OWL) and an appropriate editor or viewer (provided as a computer-executable application) can be associated with the artifact for editing or viewing the artifact. In some examples, user guidance mechanisms (e.g., computer-readable documents that are stored in computer-readable memory) can include checklists, wizards, cheat sheets and/or help pages. Depending on the configuration, each user guidance mechanism can be associated with certain states and transitions in the lifecycle. By way of non-limiting example, a checklist can be associated with a particular state transition to ensure that certain operations are performed before the transition from one state to another state can occur. In some implementations, user accounts (e.g., each user account being associated with a user role) can be defined within a user management component (e.g., the user management component 214 of FIG. 2). In this manner, user access to one or more of the artifacts can be controlled on a role-basis and/or a state basis. For example, a particular user having a user role can access an artifact during one state of the lifecycle, but might not be granted access to the artifact during another state of the lifecycle.

Figure 7:
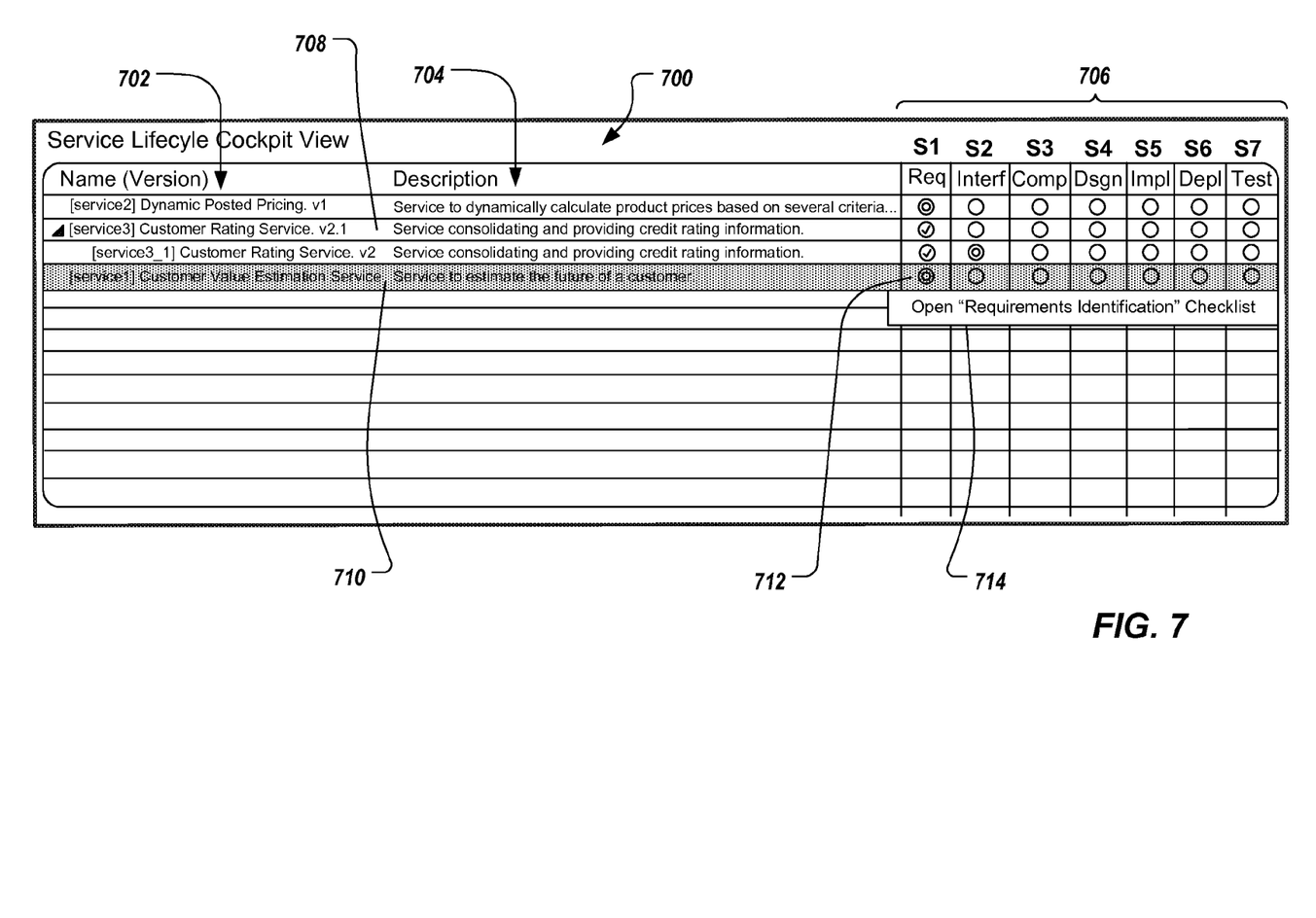
FIG. 7 depicts an example lifecycle management interface.

FIG. 7 depicts an example lifecycle management interface 700. In some examples, the lifecycle management interface 700 is an interactive interface providing the lifecycle cockpit (e.g., the lifecycle cockpit 216 of FIG. 2). In some implementations, the lifecycle management interface 700 can be provided as central interface for users of the lifecycle management toolset. The lifecycle management interface 700 can display all entities being managed by name 702 and description 704 along with information on their current state. For example, for each service 702, state status indicators 706 can be provided. In the depicted example, the state status indicators correspond to the states S1-S7 provided in the lifecycle model 400 of FIG. 4. In some implementations, the lifecycle management interface 700 displays the current lifecycle state of each entity being managed. In some examples, each state 706 can be associated with a visual indicator that represents a status of the state. For example, a checkmark and/or a first color (e.g., green) can indicate that the state is complete, an empty shape (e.g., circle) and/or a second color (e.g., red) can indicate that a transition to the state is not available in the current state, an empty shape (e.g., circle) and/or a third color (e.g., orange) can indicate that a transition to the state is available but has not yet been started, and a filled in shape (e.g., concentric shape) and/or a forth color (e.g., yellow) can indicate that a transition to the state is in progress. In the depicted example, the lifecycle management interface 700 indicates that the state S1 for a service 708 is complete and that the transition to the state S2 is in progress. In the depicted example, the lifecycle management interface 700 indicates that transition to the state S1 for a service 710 is in progress.

In some implementations, the lifecycle management interface 700 is interactive. For example, a user viewing the lifecycle management interface 700 can activate (e.g., click on) one or more portions of the lifecycle management interface 700 to induce execution of an action. By way of non-limiting example, the user can activate (e.g., click on) a visual indicator 712 associated with the state S1 of the service 710 and a menu 714 can be displayed. The menu 714 can provide options to the user. In the depicted example, the menu 714 provides an option for opening a "Requirements Identification" checklist. In some examples, the checklist can indicate activities that have been completed and/or that need to be completed to transition the lifecycle to the next state.

In some examples, the options presented in the menu 714 can be determined based on a user role of the user viewing the lifecycle management interface 700. By way of non-limiting example, if the user viewing the lifecycle management interface 700 is a service architect (e.g., as determined from log-in information provided by the user when logging into the lifecycle management toolset), a first set of options can be displayed, which includes activities that the service architect is authorized to perform. If the user viewing the lifecycle management interface 700 is a service designer (e.g., as determined from log-in information provided by the user when logging into the lifecycle management toolset), a second set of options can be displayed, which includes activities that the service designer is authorized to perform.

Figure 8:
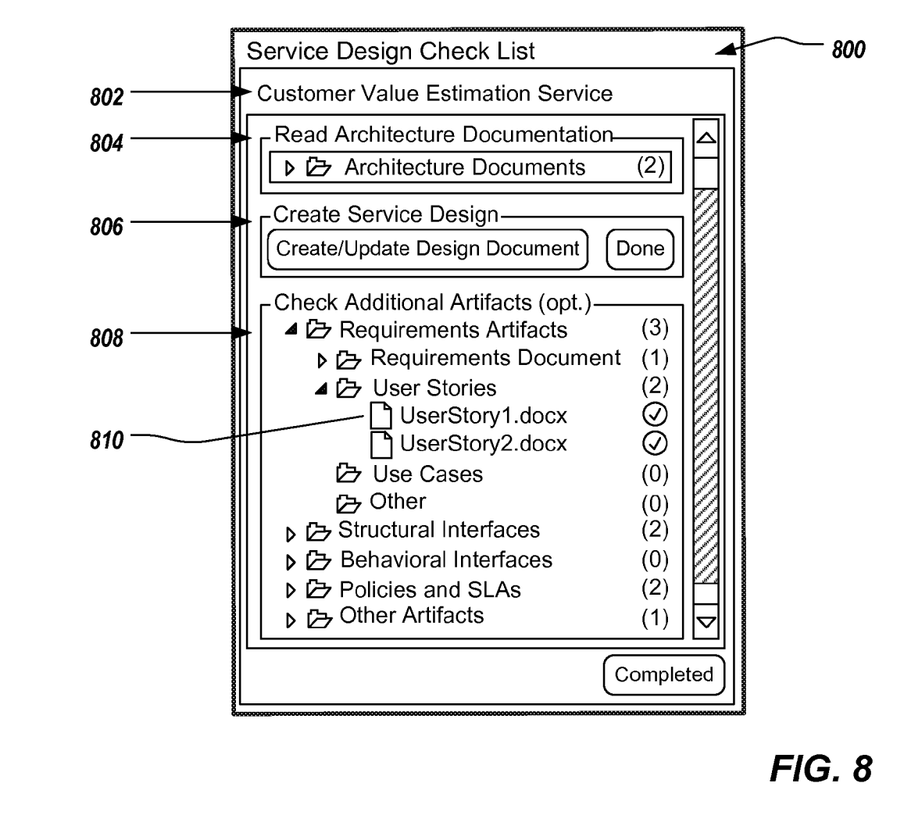
FIG. 8 depicts an example lifecycle management checklist.

FIG. 8 depicts an example lifecycle management checklist 800. In the depicted example, the lifecycle management checklist 800 corresponds to a service design checklist that indicate the status of activities that are to be performed in order to transition to the service designed state 406 of FIG. 4). In some examples the lifecycle management checklist 800 can be displayed in response to user interaction with the lifecycle management interface 700 of FIG. 7 (e.g., the user selecting "Open Service Design Checklist" from a menu). In some examples, the lifecycle management checklist 800 can display a package of main service artifacts 802. In the depicted example, the lifecycle management checklist corresponds to the service 710 depicted in the lifecycle management interface 700 of FIG. 7. In some examples, the lifecycle management checklist 800 can provide access to optional or mandatory tasks associated with a state transition. For example, the lifecycle management checklist 800 can provide quick access to architecture documentation through an interface 804 or service design documents through an interface 806. The lifecycle management checklist 800 can also include a summary of the states of other artifacts in an interface 808 with indicators on whether other tasks are required or if the tasks are completed.

In some implementations, the user can select (e.g., click on) an artifact using the checklist. In response to user selection of an artifact, a viewer and/or editor program can be executed and the artifact can be retrieved from the repository for viewing and/or editing within the viewer and/or editor program. In the depicted example, an artifact 810 can be selected and an editor (e.g., a word processing program) can be executed in response to the selection for editing the artifact 810. In some examples, the viewer and/or editor program is associated with the artifact during lifecycle configuration, as discussed above.

Figure 9:
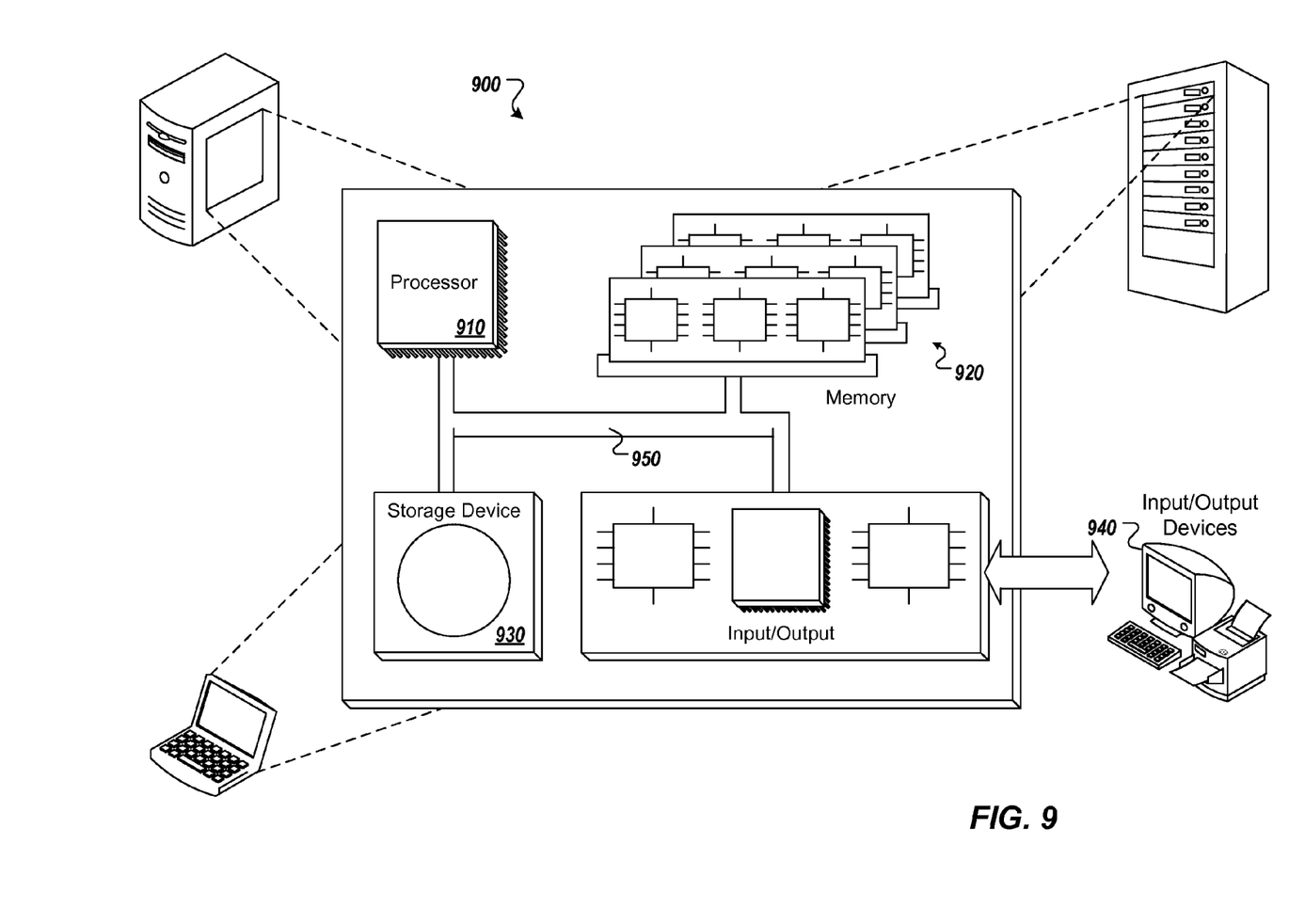
FIG. 9 is a schematic illustration of example computer systems that can be used to execute implementations of the present disclosure.

Referring now to FIG. 9, a schematic diagram of an example computing system 900 is provided. The system 900 can be used for the operations described in association with the implementations described herein. For example, the system 900 may be included in any or all of the server components discussed herein. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit. The storage device 930 is capable of providing mass storage for the system 900. In one implementation, the storage device 930 is a computer-readable medium. In various different implementations, the storage device 930 may be a floppy disk device, a hard disk device, an optical disk device, or a tape device. The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed using one or more processors, the method comprising:
receiving a lifecycle model, the lifecycle model comprising a representation of a lifecycle of an entity, the lifecycle comprising a plurality of states and transitions between states;
storing the lifecycle model in computer-readable memory, the computer-readable memory in communication with the one or more processors;
receiving one or more artifacts, the entity comprising the one or more artifacts, each artifact of the one or more artifacts being associated with at least one state of the plurality of states;
storing the one or more artifacts in the computer-readable memory;

receiving one or more user role definitions, each user role definition defining a user role that performs one or more activities associated with a state transition;

receiving a generic lifecycle management toolset from the computer-readable memory;

processing the lifecycle model, the one or more user role definitions, and the one or more artifacts to configure the generic lifecycle management toolset and define an adapted lifecycle management toolset that is specific to the entity, the adapted lifecycle management toolset comprising a lifecycle management interface and a definition of tasks associated with the one or more artifacts, the tasks comprising one or more tasks that can be performed at each of the plurality of states, each task being associated with a user role;

storing the adapted lifecycle management toolset in the computer-readable memory; and providing the lifecycle management interface for display on a display device, the lifecycle management interface displaying representations of states of the plurality of states, a status of each state and the one or more tasks for each state that can be performed by respective user roles.

2. The method of claim 1, wherein processing the lifecycle model and the one or more artifacts to configure the generic lifecycle management toolset comprises:

providing one or more state transition checklists, each state transition checklist identifying one or more activities that are to be completed before the entity can transition from a first state to a second state; and storing the one or more state transition checklists in the computer-readable memory.

3. The method of claim 2, further comprising:

receiving user input, the user input corresponding to a state transition and being generated based on user interaction with the lifecycle management interface; and displaying a state transition checklist of the one or more state transition checklists, the state transition checklist corresponding to the state transition.

4. The method of claim 2, further comprising:

displaying a state transition checklist of the one or more state transition checklists, the state transition checklist corresponding to a state transition;

receiving user input, the user input indicating a user selection of an artifact of the one or more artifacts; and in response to the user input, executing an editor program to enable editing of the artifact.

5. The method of claim 4, further comprising:

determining that a user role associated with a user that provided the user input comprises an authorized user role that is authorized to access the artifact in view of a current state, wherein executing the editor program is further in response to determining that the user role associated with the user comprises an authorized user role.

6. The method of claim 1, wherein configuration of the generic lifecycle management toolset comprises configuring a computer-executable user management system based on the one or more user role definitions, the user management system controlling user access to the one or more artifacts based on the one or more user role definitions.

7. The method of claim 6, wherein the user management system selectively authorizes a user to perform one or more activities on an artifact based on a user role associated with the user.

8. The method of claim 7, wherein the one or more activities comprise at least one of creating the artifact, editing the artifact and reading the artifact.

9. The method of claim 1, wherein configuration of the generic lifecycle management toolset comprises associating each artifact of the one or more artifacts with a respective artifact editor.

10. The method of claim 9, wherein each artifact of the one or more artifacts comprises a computer-readable document that can be edited using the respective artifact editor.

11. The method of claim 9, further comprising:

receiving user input associated with an artifact; and in response to the user input:

retrieving the artifact from computer-readable memory;

executing an artifact editor associated with the artifact; and displaying the artifact within the artifact editor for editing of the artifact by a user that provided the user input.

12. The method of claim 11, wherein the user input is received through the lifecycle management interface.

13. The method of claim 1, further comprising receiving one or more update semantic definitions, each update semantic defining a subset of the one or more artifacts that are updated during a state transition and one or more user roles that perform updating of the subset of the one or more artifacts, wherein the generic lifecycle management toolset is configured further based on the one or more update semantics definitions.

14. The method of claim 13, wherein the one or more update semantics definitions are provided in a spreadsheet.

15. The method of claim 1, wherein the lifecycle management interface is interactive to receive user input.

16. The method of claim 15, wherein each representation of a state is user-selectable to initiate one or more activities associated with a state transition.

17. The method of claim 1, wherein the entity comprises software associated with a computer-implemented service.

18. A non-transitory computer-readable storage medium coupled to one or more processors and having instructions stored thereon which, when executed by the one or more processors, cause the one or more processors to perform operations for improving keyword searches, the operations comprising:

receiving a lifecycle model, the lifecycle model comprising a representation of a lifecycle of an entity, the lifecycle comprising a plurality of states and transitions between states;

storing the lifecycle model in computer-readable memory;

receiving one or more artifacts, the entity comprising the one or more artifacts, each artifact of the one or more artifacts being associated with at least one state of the plurality of states;

storing the one or more artifacts;

receiving one or more user role definitions, each user role definition defining a user role that performs one or more activities associated with a state transition;

receiving a generic lifecycle management toolset;

processing the lifecycle model, the one or more user role definitions, and the one or more artifacts to configure the generic lifecycle management toolset and to define an adapted lifecycle management toolset that is specific to the entity, the adapted lifecycle management toolset comprising a lifecycle management interface and a definition of tasks associated with the one or more artifacts, the tasks comprising one or more tasks that can be performed at each of the plurality of states, each task being associated with a user role;

storing the adapted lifecycle management toolset; and providing the lifecycle management interface for display on a display device, the lifecycle management interface displaying representations of states of the plurality of states, a status of each state and the one or more tasks for each state that can be performed by respective user roles.

19. A system, comprising:
a computing device; and
a computer-readable storage device coupled to the computing device and having instructions stored thereon which, when executed by the computing device, cause the computing device to perform operations for improving keyword searches for enterprise services, the operations comprising:
receiving a lifecycle model, the lifecycle model comprising a representation of a lifecycle of an entity, the lifecycle comprising a plurality of states and transitions between states;
storing the lifecycle model;
receiving one or more artifacts, the entity comprising the one or more artifacts, each artifact of the one or more artifacts being associated with at least one state of the plurality of states;
storing the one or more artifacts;
receiving one or more user role definitions, each user role definition defining a user role that performs one or more activities associated with a state transition;
receiving a generic lifecycle management toolset;
processing the lifecycle model, the one or more user role definitions, and the one or more artifacts to configure the generic lifecycle management toolset and to define an adapted lifecycle management toolset that is specific to the entity, the adapted lifecycle management toolset comprising a lifecycle management interface and a definition of tasks associated with the one or more artifacts, the tasks comprising one or more tasks that can be performed at each of the plurality of states, each task being associated with a user role;
storing the adapted lifecycle management toolset; and
providing the lifecycle management interface for display on a display device, the lifecycle management interface displaying representations of states of the plurality of states, a status of each state and the one or more tasks for each state that can be performed by respective user roles.

\* \* \* \* \*